United States Patent [19]

Schwarz et al.

[11] 4,315,575

[45] Feb. 16, 1982

[54] VACUUM SUPPORT FOR BURST PROTECTION DEVICE

[75] Inventors: Erwin Schwarz, Meitingen; Adolf Swozil, Kühlenthal, both of Fed. Rep. of Germany

[73] Assignee: Sigri Elektrographit Gesellschaft mit beschrankter Haftung, Meitingen bei Augsburg, Fed. Rep. of Germany

[21] Appl. No.: 153,901

[22] Filed: May 28, 1980

[51] Int. Cl.³ .......................................... B65D 25/00
[52] U.S. Cl. .............................. 220/89 A; 137/68 R; 251/368
[58] Field of Search ............... 137/68 R, 68 A, 69, 137/70, 71, 512.2; 220/89 A; 423/448; 251/368

[56] References Cited

U.S. PATENT DOCUMENTS

| | | | |
|---|---|---|---|
| 2,922,544 | 1/1960 | Hibbard | 200/89 A |
| 2,947,443 | 8/1960 | Sawyer | 200/89 A |
| 3,378,029 | 4/1968 | Lee | 137/512.2 X |

FOREIGN PATENT DOCUMENTS 411408  6/1910  France ............................ 137/512.2

*Primary Examiner*—Harold W. Weakley
*Attorney, Agent, or Firm*—Herbert L. Lerner; Laurence A. Greenberg

[57] ABSTRACT

Vacuum support for a burst protection device of graphite, which support is a graphite disc formed by a multiplicity of graphite rings, each of which consists of at least two parts and has a prismatic cross section, the prism surfaces being inclined relative to the plane of the disc.

2 Claims, 1 Drawing Figure

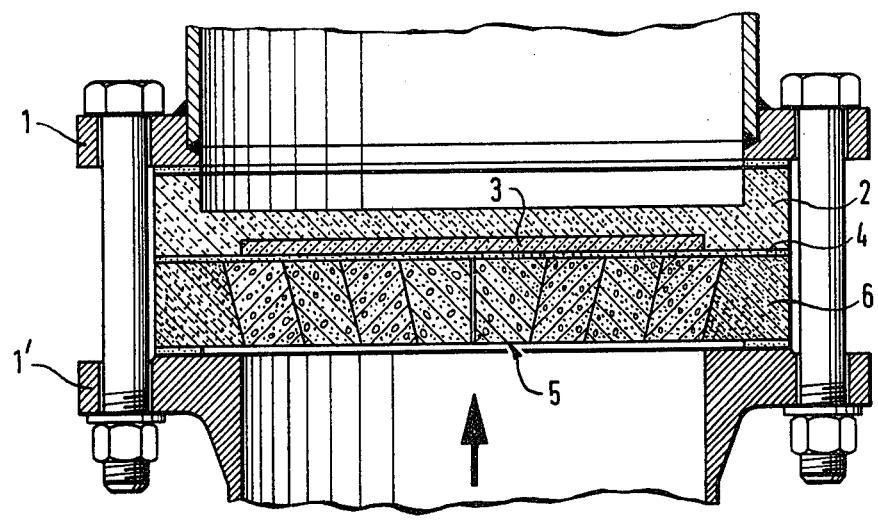

VACUUM SUPPORT FOR BURST PROTECTION DEVICE

BACKGROUND OF THE INVENTION

1. Field of the Invention

The invention relates to a vacuum support for a burst protection device of graphite.

2. Description of the Prior Art

For protecting closed spaces such as chemical apparatus against a spontaneous pressure rise within the spaces, the use of burst protection devices or rupture discs is known. They break or burst when the pressure permissible for the vessel or apparatus is exceeded and relieve the pressure in the vessel in a very short time. A particularly advantageous material for burst protection devices is graphite which has excellent corrosion resistance and fatigue strength. Furthermore, the graphite is independent of the application temperature in the temperature range common in chemical apparatus. A further advantage of burst protection devices of graphite is its brittle fracture nature which results in release of the entire pipe or nozzle cross section suddenly and without delay. If underpressure prevails continuously or temporarily at least in the vessels to be protected, it is necessary or advisable to use special vacuum supports which rest against the surface of the burst protection device facing the vessel and prevent deflection thereof in the direction toward the vessel.

Vacuum supports consist of graphite discs which are provided with a multiplicity of parallel holes. The vacuum supports are generally clamped in such a manner that they are not destroyed if the rupture disc responds and can be re-used. The material-saving mechanical design, on the other hand, reduces the free discharge cross section and the outflow number $\alpha$ which is defined as the ratio of the effective outflow to the flow in a smooth pipe by an average of about 40%, so that the cross section of the burst protection device must as a rule be increased relative to designs without vacuum support. The other alternative, the simultaneous destruction of vacuum support and burst protection device, is not satisfactory because of the large expenditure of technical means.

SUMMARY OF THE INVENTION

It is, therefore, an object of the invention to provide a vacuum support which does not materially influence the response accuracy of the rupture discs and does not delay the rupture instant. The vacuum support can be replaced after each response of the burst protection device without detrimental costs.

With the foregoing and other objects in view, there is provided in accordance with the invention a vacuum support for a burst protection device of graphite, comprising a graphite disc formed by a multiplicity of graphite rings, each of which consists of at least two parts and has a prismatic cross section, the prism surfaces being inclined relative to the plane of the disc.

Although the vacuum is illustrated and described herein as embodied in a vacuum support for burst protection device, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing in which is diagrammatically shown in section a rupture disc formed of graphite together with a vacuum support disc formed of a plurality of graphite rings.

DETAILED DESCRIPTION OF THE INVENTION

In graphite discs shaped in accordance with the invention, the rings are preferably arranged in log-fashion. The angle of inclination of the prism surfaces or annular surfaces of the rings to the plane of the disc decreases as a rule with the distance of the surfaces from the center of the disc and the extended prism surfaces intersect on the vessel side of the burst protection device. If the vessel to be protected is operated at reduced pressure, the individual rings of the discs are braced against each other; in the case of overpressure, the rings are pressed against the burst protection device. If a permissible pressure is exceeded, the rings together with the rupture disc are pushed out of the holding device and release the entire cross section, so that the desired pressure relief is obtained in a very short time. In contrast to the known vacuum supports, the expense for making the graphite rings, which have simple shapes, is small, so that the advantage of the large discharge cross section can be exploited without detrimental costs.

For manufacturing the graphite rings, milled and sorted coke fractions are mixed with a pyrolizable binder. The mixture is molded by pressing, vibrating or by other forming methods, and the moldings are heated to a temperature around 1200 K for a carbonizing the binder. the "baked" moldings are then graphitized by heating them to a temperature around 3000 K, preferably in an electric resistance furnace. The rings are made from the graphite bodies by sawing, turning, grinding and the like.

According to another method which yields graphite discs with particularly little spread of the pertinent properties and allows manufacturing the discs to dimension, planar textile structures of carbon or graphite fibers, for instance, carbon fabrics, are stacked on top of each other. The stacks are impregnated under pressure optionally with coal tar pitch or a synthetic resin and are then subjected to the above-described temperature treatment. This produces a composite material which contains carbon fibers embedded in a graphite matrix as reinforcement elements. If necessary, the impregnation and the temperation treatment can be repeated several times.

The invention will be explained in the following by way of example, referring to the drawing.

Between the flanges 1 and 1' are clamped the rupture disc 2 of graphite and the ring-shaped mounting 6, also consisting of graphite, and the support disc 5 which is formed by rings. Into the rupture disc is laid a pressure plate 3 which is movable in the direction of the force. The gas-impermeable graphite foil 4 is arranged between the rupture disc 2 or the pressure plate 3, respectively, and the suupport disc 5 and the holding ring 6.

It was observed in comparison tests that the support discs formed by rings did not influence the response accuracy of the rupture discs and did not delay the rupture instant. In the rupture, the entire cross section of the rupture disc was always released suddenly.

There is claimed:

1. Vacuum support for a burst protection device of graphite, comprising a graphite disc formed by a multiplicity of graphite rings, each of which consists of at least two parts and has a prismatic cross section, the prism surfaces being inclined relative to the plane of the disc, with opposite prism surfaces having inclinations different from each other restricting movement of the parts in a direction away from the burst protection device.

2. Vacuum support according to claim 1, wherein the graphite rings contain carbon fibers as reinforcement elements.

* * * * *